US012655767B2

(12) United States Patent
Choi et al.

(10) Patent No.: US 12,655,767 B2
(45) Date of Patent: Jun. 16, 2026

(54) TURBINE AIRFOIL AND GAS TURBINE INCLUDING THE SAME

(71) Applicant: DOOSAN ENERBILITY CO., LTD., Changwon (KR)

(72) Inventors: Jung Uk Choi, Suwon (KR); Kidon Lee, Gimhae (KR)

(73) Assignee: DOOSAN ENERBILITY CO., LTD, Changwon (KR)

( * ) Notice: Subject to any disclaimer, the term of this patent is extended or adjusted under 35 U.S.C. 154(b) by 0 days.

(21) Appl. No.: 19/232,069

(22) Filed: Jun. 9, 2025

(65) Prior Publication Data

US 2025/0389194 A1     Dec. 25, 2025

(30) Foreign Application Priority Data

Jun. 24, 2024    (KR) ........................ 10-2024-0081834

(51) Int. Cl.
| | |
|---|---|
| *F01D 5/18* | (2006.01) |
| *F02C 3/00* | (2006.01) |
| *F02C 7/18* | (2006.01) |

(52) U.S. Cl.
CPC .................. *F01D 5/18* (2013.01); *F02C 3/00* (2013.01); *F02C 7/18* (2013.01)

(58) Field of Classification Search
CPC . F01D 5/186; F01D 5/187; F01D 5/18; F02C 3/00; F02C 7/18; F05D 2260/20; F05D 2260/202; F05D 2260/232
See application file for complete search history.

(56) References Cited

U.S. PATENT DOCUMENTS 7,328,580 B2 *   2/2008   Lee ...................... B23K 26/384
                    415/115
8,683,814 B2 *   4/2014   Xu ............................ F23R 3/06
                    415/115

(Continued)

FOREIGN PATENT DOCUMENTS

| EP | 1655453 B1 | 6/2014 |
|---|---|---|
| JP | 2014-227914 A | 12/2014 |

(Continued)

OTHER PUBLICATIONS

European Search Report Dated Oct. 16, 2025, Issued for European patent application (Appl. No. 25172662.6).

(Continued)

*Primary Examiner* — William H Rodriguez

(74) *Attorney, Agent, or Firm* — Harvest IP Law, LLP

(57) ABSTRACT

Disclosed is a turbine airfoil including an airfoil body including an outer wall configured to define an internal space, in which a cooling hole is formed in the outer wall and allows the internal space S and an external space of the airfoil body to communicate with each other. The inner surface of the outer wall, which defines the cooling hole, includes a first inner surface, and a second inner surface configured to define an outer hole region of the cooling hole H that communicates with the external space, in which the outer hole region is provided as a plurality of outer hole regions spaced apart from one another, and in which the outer wall includes a partition section provided between the two adjacent outer hole regions.

14 Claims, 5 Drawing Sheets

(56)     References Cited

U.S. PATENT DOCUMENTS

| | | | |
|---|---|---|---|
| 8,850,828 B2 * | 10/2014 | Mongillo, Jr. .......... | F01D 9/065 |
| | | | 415/115 |
| 9,279,330 B2 * | 3/2016 | Xu ........................... | F01D 9/041 |
| 9,410,435 B2 * | 8/2016 | Xu ........................... | F01D 9/065 |
| 9,599,411 B2 * | 3/2017 | Tanaka .................... | F01D 5/186 |
| 10,329,920 B2 * | 6/2019 | Xu ........................... | F01D 5/186 |
| 2006/0099074 A1 | 5/2006 | Kopmels | |
| 2008/0145234 A1 * | 6/2008 | Lee ......................... | F01D 5/187 |
| | | | 164/47 |
| 2010/0068068 A1 | 3/2010 | Liang | |
| 2013/0209227 A1 * | 8/2013 | Xu ........................... | F01D 5/186 |
| | | | 415/115 |
| 2013/0209229 A1 | 8/2013 | Xu | |
| 2014/0116666 A1 | 5/2014 | Xu | |
| 2015/0159871 A1 * | 6/2015 | Pearson .................. | F02K 1/822 |
| | | | 60/754 |
| 2015/0377033 A1 * | 12/2015 | Xu ........................... | F23R 3/02 |
| | | | 415/177 |
| 2016/0069192 A1 * | 3/2016 | Tanaka .................... | B23H 9/10 |
| | | | 416/232 |
| 2016/0341048 A1 | 11/2016 | Xu | |
| 2017/0298743 A1 * | 10/2017 | Webster ................... | F23R 3/04 |
| 2018/0010465 A1 * | 1/2018 | Xu ........................... | F23R 3/06 |
| 2018/0135520 A1 * | 5/2018 | Lewis ..................... | F01D 11/08 |
| 2018/0274370 A1 * | 9/2018 | Bunker ................... | F01D 5/186 |
| 2018/0340426 A1 * | 11/2018 | Mongillo ................. | F02C 3/04 |
| 2019/0078443 A1 * | 3/2019 | Beck ....................... | F01D 5/186 |
| 2019/0169996 A1 * | 6/2019 | Whitfield ................. | F02C 9/18 |
| 2019/0186272 A1 | 6/2019 | Webster | |
| 2021/0239005 A1 | 8/2021 | Webster | |
| 2022/0018260 A1 * | 1/2022 | Mongillo, Jr. .......... | F23R 3/002 |
| 2022/0049608 A1 * | 2/2022 | Quach ..................... | F01D 5/282 |
| 2023/0051153 A1 * | 2/2023 | Craig ..................... | F23R 3/005 |
| 2023/0151737 A1 * | 5/2023 | Propheter-Hinckley .................... | |
| | | | F01D 5/18 |
| | | | 416/90 R |

FOREIGN PATENT DOCUMENTS

| | | |
|---|---|---|
| KR | 10-1827174 B1 | 2/2018 |
| KR | 10-2023-0000393 A | 1/2023 |
| KR | 10-2024-0002657 A | 1/2024 |
| KR | 10-2626194 B1 | 1/2024 |
| KR | 10-2024-0113741 A | 7/2024 |
| KR | 10-2024-0142149 A | 9/2024 |

OTHER PUBLICATIONS

Office Action from Korean Ptaent Office Dated Mar. 1, 2026, Issued for Corresponding Korean Patent Applicaiton. No English translation was provided.

* cited by examiner

TURBINE AIRFOIL AND GAS TURBINE INCLUDING THE SAME

CROSS-REFERENCE TO RELATED APPLICATION

This application claims priority to and the benefit of Korean Patent Application No. 10-2024-0081834 filed in the Korean Intellectual Property Office on Jun. 24, 2024, the entire contents of which are incorporated herein by reference.

TECHNICAL FIELD

The present disclosure relates to a turbine airfoil and a gas turbine including the same, and more particularly, to a turbine airfoil having a hole formed therein, and a gas turbine including the same.

BACKGROUND ART

A turbine refers to a mechanical device that obtains a rotational force from an impact force or reaction force by using a flow of a compressible fluid such as vapor and gas. The turbines are classified into a vapor turbine using vapor, and a gas turbine using high-temperature combustion gas.

Among the turbines, the gas turbine broadly includes a compressor, a combustor, and a turbine. The compressor has an air inlet into which air is introduced, and a plurality of compressor vanes and a plurality of compressor blades are alternately disposed in a compressor casing.

The combustor produces high-temperature, high-pressure combustion gas by supplying fuel to the compressed air compressed by the compressor and igniting the fuel by using a burner.

The turbine includes a plurality of turbine vanes and a plurality of turbine blades that are alternately disposed in a turbine casing. In addition, a rotor is disposed to penetrate the compressor, the combustor, the turbine, and a central portion of an exhaust chamber.

Two opposite ends of the rotor are rotatably supported by bearings. Further, a plurality of discs is fixed to the rotor, and the blades are respectively connected to the discs, and a driving shaft of an electric generator is connected to an end of the rotor adjacent to the exhaust chamber.

Because the gas turbine does not have a reciprocating mechanism similar to a piston of a four-stroke engine, the gas turbine does not have mutual friction parts similar to the piston and a cylinder. Therefore, the gas turbine has an advantage in that the gas turbine consumes an extremely small amount of lubricating oil, an amplitude, which is one of the characteristics of the reciprocating mechanism, is significantly reduced, and the gas turbine may operate at high speed.

An operation of the gas turbine will be briefly described. The air compressed by the compressor is mixed with fuel and combusted, such that high-temperature combustion gas is produced, and the combustion gas produced as described above is injected into the turbine. The injected combustion gas generates a rotational force while passing over the turbine vanes and the turbine blades, such that the rotor rotates.

Meanwhile, in the related art, a film cooling method is applied to cool the turbine nozzles, the turbine blades, or the like used for the gas turbine. The film cooling method refers to a method of forming a hole in a surface of the turbine blade or the like and then spraying compressed air through the hole to protect the surface of the turbine blade or the like exposed to a high-temperature combustion gas.

SUMMARY

The present disclosure has been made in an effort to provide a turbine airfoil capable of implementing effective film cooling in comparison with the related art.

In order to achieve the above-mentioned object, one aspect of the present disclosure provides a turbine airfoil including: an airfoil body including an outer wall configured to define an internal space S and a cooling hole H formed in the outer wall, wherein the cooling hole allows the internal space and an external space of the airfoil body to communicate with each other, in which the cooling hole is defined by an inner surface of the outer wall, the inner surface of the outer wall includes: a first inner surface which defines an inner hole region H1 of the cooling hole H that communicates with the internal space; and a second inner surface which defines an outer hole region H2 of the cooling hole H that communicates with the external space, in which the outer hole region H2 is provided as a plurality of outer hole regions H2 spaced apart from one another, and in which the outer wall includes a partition section provided between the two adjacent outer hole regions H2.

The inner surface of the outer wall may further include a third inner surface configured to define a connection hole region H3 of the cooling hole H that connects the inner hole region H1 and the outer hole region H2, and the plurality of outer hole regions H2 may branch off from the connection hole region H3.

When a first cross-section of the airfoil body is defined by a section made by cutting, along a first plane, a region including the first inner surface, the second inner surface, and the third inner surface, in the first cross-section, a direction in which the third inner surface positioned at one side of the cooling hole is bent relative to the first inner surface and a direction in which the third inner surface positioned at the other side of the cooling hole is bent relative to the first inner surface are opposite to each other.

In the first cross-section of the airfoil body, the plurality of outer hole regions H2 may be provided to be spaced apart from one another in an extension direction of the first plane.

In the first cross-section of the airfoil body, a size of an angle ($\beta_{lat1}$) defined between a straight line parallel to the first inner surface and a straight line parallel to the third inner surface positioned at one side of the cooling hole H may be equal to a size of an angle ($\beta_{lat2}$) defined between a straight line parallel to the first inner surface and a straight line parallel to the third inner surface positioned at the other side of the cooling hole H.

In the first cross-section of the airfoil body, the second inner surface and the third inner surface may be positioned on the same plane.

In the first cross-section of the airfoil body, a size of an angle ($\gamma_{lat1}$) defined between a straight line parallel to the second inner surface provided at one side boundary of the partition section and the straight line parallel to the first inner surface may be equal to a size of an angle ($\gamma_{lat2}$) defined between a straight line parallel to the second inner surface provided at the other side boundary of the partition section and the straight line parallel to the first inner surface.

In the first cross-section of the airfoil body, the sizes of the angles ($\beta_{lat1}$, $\beta_{lat2}$) may be equal to or larger than the sizes of the angles ($\gamma_{lat1}$, $\gamma_{lat2}$).

In the first cross-section of the airfoil body, the sizes of the angles ($\beta_{lat1}$, $\beta_{lat2}$) may be 10 degrees or more and 30 degrees or less.

An area of each of the plurality of outer hole regions H3 may be 1.0 or more times an area of the inner hole region H1.

In the first cross-section of the airfoil body, the connection hole region H3 may include a section in which a width thereof increases as the distance from the external space decreases.

In the first cross-section of the airfoil body, the outer hole region H2 may include a section in which a width thereof increases as the distance from the external space decreases.

In the first cross-section of the airfoil body, the inner hole region H1 may include a section in which a width thereof is constant.

When a second cross-section of the airfoil body is defined by a section made by cutting, along a second plane intersecting the first plane, the region including the first inner surface, the second inner surface, and the third inner surface, then, in the second cross-section of the airfoil body, the inner hole section H1, the outer hole section H2, or the connection hole section H3 may include a section in which a width thereof is constant.

In the second cross-section of the airfoil body, the first inner surface, the second inner surface, and the third inner surface may be positioned on the same plane.

In order to achieve the above-mentioned object, another aspect of the present disclosure provides a gas turbine including: a compressor section configured to supply compressed air; a combustor configured to receive the compressed air discharged from the compressor section and produce a combustion gas by combusting the compressed air; and a turbine section configured to receive the combustion gas produced by the combustor and including a plurality of turbine airfoils, in which each of the plurality of turbine airfoils includes an airfoil body including an outer wall configured to define an internal space S a cooling hole H formed in the outer wall, wherein the cooling hole allows the internal space S and an external space of the airfoil body to communicate with each other, in which the cooling hole is defined by an inner surface of the outer wall, the inner surface of the outer wall includes: a first inner surface which defines an inner hole region H1 of the cooling hole H that communicates with the internal space S; and a second inner surface which defines an outer hole region H2 of the cooling hole H that communicates with the external space, in which the outer hole region H2 is provided as a plurality of outer hole regions H2 spaced apart from one another, and in which the outer wall includes a partition section provided between the two adjacent outer hole regions H2.

According to the present disclosure, it is possible to provide the turbine airfoil capable of implementing the effective film cooling in comparison with the related art.

DETAILED DESCRIPTION

Hereinafter, a turbine airfoil and a gas turbine according to the present disclosure will be described with reference to the drawings.

Turbine Airfoil and Gas Turbine

Figure 1:
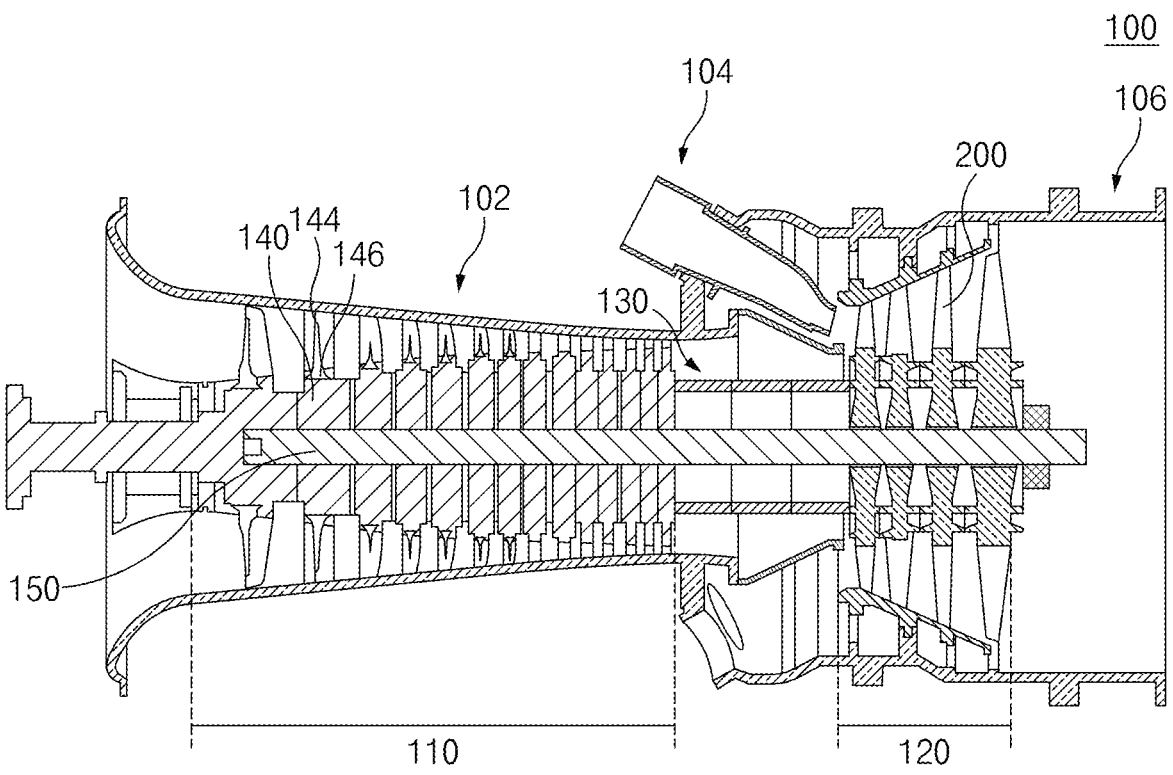
FIG. 1 is a cross-sectional view illustrating a schematic structure of a gas turbine according to the present disclosure.
Figure 2:
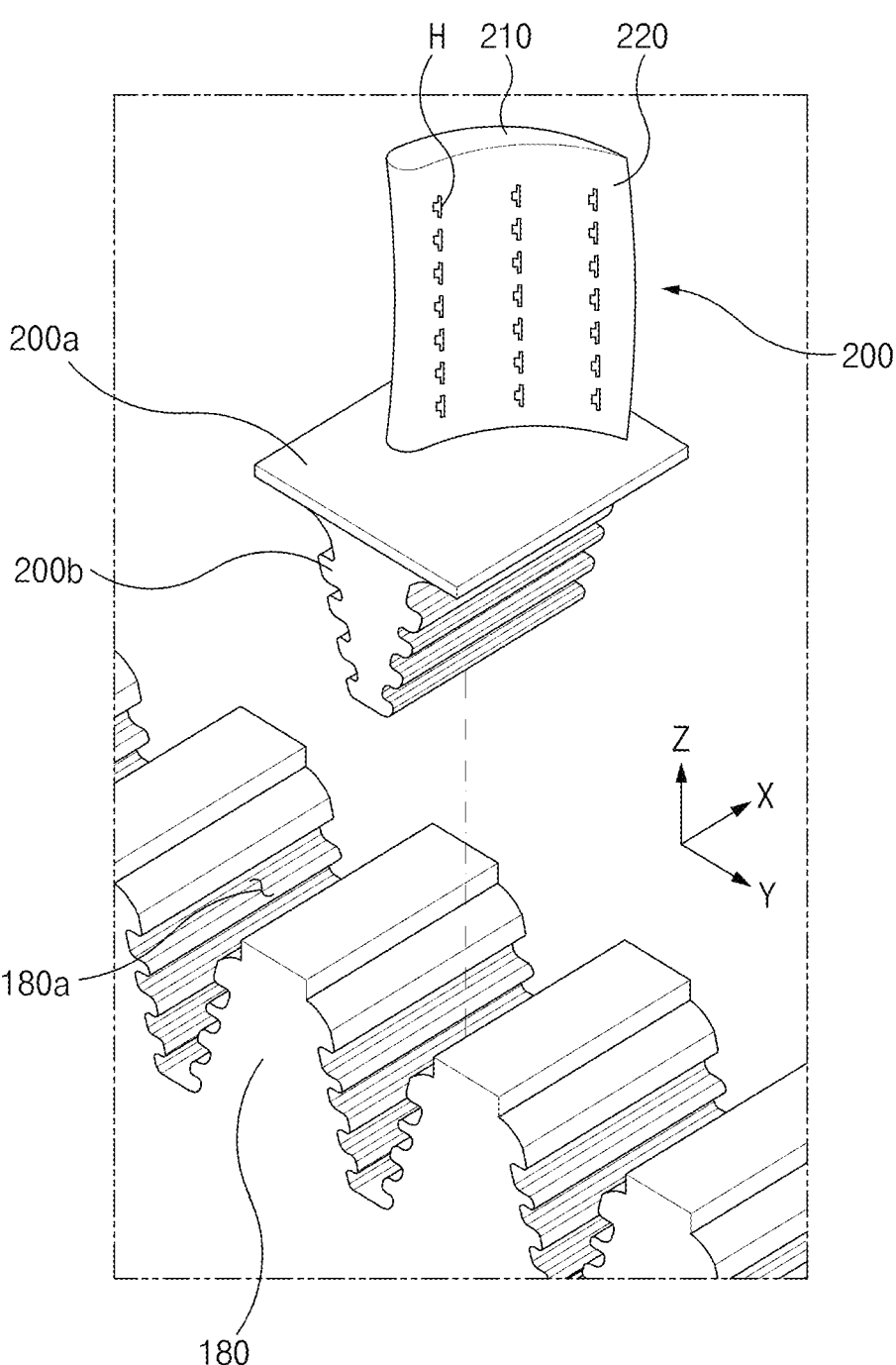
FIG. 2 is a perspective view of a turbine blade provided in a turbine section of the gas turbine illustrated in FIG. 1.

FIG. 1 is a cross-sectional view illustrating a schematic structure of a gas turbine according to the present disclosure, FIG. 2 is a perspective view of a turbine blade provided in a turbine section of the gas turbine illustrated in FIG. 1.

The gas turbine may broadly include a compressor section configured to supply compressed air, a combustor configured to receive the compressed air discharged from the compressor section and produce a combustion gas by combusting the compressed air, and a turbine section configured to receive the combustion gas produced by the combustor and including a plurality of turbine airfoils. Detailed structures of the compressor section, the combustor, and the turbine section will be described below with reference to the drawings.

More specifically, with reference to FIG. 1, the gas turbine may have a housing 102. A diffuser 106 may be provided rearward of the housing 102, and the combustion gas having passed through the turbine section may pass through the diffuser 106. Further, a combustor 104 may be disposed forward of the diffuser 106 and configured to receive the compressed air from the compressor section and combust the received compressed air.

The description will be made based on a flow direction of air. A compressor section 110 may be positioned at an upstream side of the housing 102, and a turbine section 120 is disposed at a downstream side of the housing 102. Further, a torque tube 130 may be disposed between the compressor section 110 and the turbine section 120 and serve as a torque transmission member that transfers rotational torque generated in the turbine section to the compressor section.

A plurality of (e.g., fourteen) compressor rotor discs 140 may be provided in the compressor section 110. The compressor rotor discs 140 may be fastened to one another by a tie bolt (or tie rod) 150 so as not to be spaced apart from one another in an axial direction.

Specifically, the compressor rotor discs 140 may be aligned with one another in the axial direction in a state in which the tie bolt 150 penetrates approximately centers of the compressor rotor discs 140. In this case, the surfaces of the adjacent compressor rotor discs 140, which face one another, are compressed by the tie bolt 150, such that the adjacent compressor rotor discs 140 may be disposed so as not to rotate relative to one another.

A plurality of blades 144 may be radially coupled to outer peripheral surfaces of the compressor rotor discs 140. The blades 144 may respectively have root portions 146 fastened to the compressor rotor discs 140.

Vanes (not illustrated) fixedly disposed on the housing may be positioned between the rotor discs 140. Unlike the rotor discs, the vanes may be fixed so as not to rotate. The vanes may serve to align flows of the compressed air having passed over the blades of the compressor rotor discs and guide the air to the blades of the rotor discs positioned at the downstream side.

Methods of fastening the root portion 146 may be classified into a tangential type method and an axial type method. The method may be selected depending on a necessary structure of a commercially available gas turbine, and the structure may have a dove-tail shape or a fir-tree shape that is typically known. In some instances, the blade may be fastened to the rotor disc by using a fastening device other than the above-mentioned component, for example, by using a fixture such as a key or a bolt.

The tie bolt 150 may be disposed to penetrate the central portions of the plurality of compressor rotor discs 140 and central portions of turbine rotor discs 180. One end of the tie bolt 150 may be fastened to the compressor rotor disc positioned at the most upstream side, and the other end of the tie bolt 150 may be fastened by a fixing nut 190.

The tie bolt 150 may have various structures depending on the gas turbine, and the shape of the tie bolt 150 is not necessarily limited to the shape illustrated in FIG. 1. That is, as illustrated, the single tie bolt may penetrate the central portions of the rotor discs, or a plurality of tie bolts may be disposed on circumferences of the rotor discs. The above-mentioned configurations may be interchangeable.

Although not illustrated in the drawings, in the compressor of the gas turbine, vanes may be installed at positions positioned rearward of the diffuser and serve as guide feathers for setting a flow angle of a fluid, which is introduced into a combustor inlet after raising a pressure of the fluid, to a designed flow angle. The vane may be a deswirler.

The combustor 104 produces high-temperature, high-pressure combustion gas with high energy by mixing the introduced compressed air with fuel and combusting the fuel, thereby performing an isobaric combustion process that raises a temperature of the combustion gas to a heat resistance limit that the combustor and the turbine component may withstand.

The combustor, which constitutes a combustion system of the gas turbine, may be provided as a plurality of combustors arranged in a casing provided in the form of a cell. The combustor may include a burner having a fuel injection nozzle and the like, a combustor liner configured to define a combustion chamber, and a transition piece configured to serve as a connection portion between the combustor and the turbine.

Specifically, the liner provides a combustion space in which the fuel injected by the fuel nozzle is mixed with the compressed air from the compressor and combusted. The liner may include a flame container configured to provide the combustion space in which the fuel mixed with air is combusted, and a flow sleeve configured to form an annular space while surrounding the flame container. In addition, the fuel nozzle may be coupled to a front end of the liner, and a spark plug may be coupled to a sidewall of the liner.

Meanwhile, the transition piece may be connected to a rear end of the liner to transmit the combustion gas, which is combusted by the spark plug, toward the turbine. An outer wall portion of the transition piece may be cooled by the compressed air supplied from the compressor to prevent damage caused by a high temperature of the combustion gas.

To this end, cooling holes may be provided in the transition piece to inject air into the transition piece, and the compressed air may cool a main body, which is disposed inward, through the holes and then flow toward the liner.

The cooling air, which has cooled the transition piece, flows in the annular space of the liner. The compressed air, which is provided outside the flow sleeve as cooling air through cooling holes provided in the flow sleeve, may collide with an outer wall of the liner.

Meanwhile, the high-temperature, high-pressure combustion gas discharged from the combustor may be supplied to the turbine section 120. The supplied high-temperature, high-pressure combustion gas collides with rotary blades of the turbine while expanding and provides a reaction force to generate rotational torque. The obtained rotational torque may be transmitted to the compressor section via the torque tube, and power, which exceeds power required to operate the compressor, may be used to operate an electric generator or the like.

The turbine section 120 may be basically similar in structure to the compressor section. That is, the plurality of turbine rotor discs 180 similar to the compressor rotor discs in the compressor section are also provided in the turbine section 120. Therefore, the turbine rotor disc 180 may also include a plurality of turbine airfoils 200 disposed radially. The turbine airfoils 200 may also be coupled to the turbine rotor discs 180 in a dove-tail manner or the like. Further, vanes (not illustrated) fixed to the housing may also be provided between the turbine airfoils 200 of the turbine rotor discs 180. The vanes may guide a flow direction of the combustion gas having passed over the blades.

Meanwhile, with reference to FIG. 2, the turbine rotor disc 180 may have an approximately circular plate shape. A plurality of coupling slots 180a may be formed in an outer peripheral portion of the turbine rotor disc 180. The coupling slot 180a may be formed to have a curved surface having a fir-tree shape.

The turbine airfoil 200 may be fastened to the coupling slot 180a. In FIG. 2, the turbine airfoil 200 may have a platform portion 200a. The platform portion 200a may be in a flat plate shape. The platform portion 200a may have a lateral surface that adjoins a lateral surface of the platform portion 200a of the adjacent turbine airfoil, such that the platform portions 200a may serve to maintain an interval between the adjacent airfoils. A root portion 200b may be formed on a bottom surface of the platform portion 200a. The root portion 200b may have a so-called axial-type shape, designed to be inserted into the coupling slot 180a of the rotor disc 180 along the axial direction X of the rotor disc 180.

The root portion 200b may have a curved portion with an approximately fir-tree shape. The curved portion may be formed to match the corresponding curved portion of the coupling slot. Alternatively, the coupling structure of the root portion may be formed to have a dove-tail shape without necessarily having a fir-tree shape.

An airfoil body 210 may be formed on an upper surface of the platform portion 200a. The airfoil body 210 may be formed to have an airfoil optimized in accordance with the specifications of the gas turbine. The airfoil body 210 may have a leading edge (LE) disposed at the upstream side based on the flow direction of the combustion gas, and a trailing edge (TE) disposed at the downstream side. The leading edge (LE) is an edge of the airfoil body 210 which receives the incoming fluid flow, and the trailing edge (TE) is an opposite distal edge where the fluid flow exits. The leading edge (LE) and the trailing edge (TE) are at the positions where the pressure side surface (PS) and the suction side surface (SS) meet.

Referring to FIG. 2, a direction Z from the root portion 200b toward an airfoil body 210 may be referred to as a radial direction. That is, the radial direction is a direction from the rotor disc 180 toward the tip of the airfoil body 210. The axial direction X is defined as a direction along the tie bolt (or tie rod) 150. The circumferential direction Y is defined as a direction generally along the circular circumference of the rotor discs having the tie bolt 150 in its center.

In this case, unlike the blade in the compressor section, the airfoil in the turbine section comes into direct contact with a high-temperature, high-pressure combustion gas. Because a temperature of the combustion gas may be a high temperature of up to 1,700° C., a means for cooling the airfoil may be required. To this end, in some locations in the compressor section, there may be a cooling air flow path that draws compressed air and supplies the compressed air to the turbine section side airfoil.

The cooling air flow path may be formed to extend from the outside of the housing (outer flow path) or formed to extend while penetrating the inside of the rotor disc (inner flow path). Alternatively, both the outer and inner flow paths may be used.

As shown in FIG. 2, a plurality of cooling holes H may be formed in a surface of the airfoil body. The cooling holes H may communicate with the internal space (not illustrated) formed in the airfoil body 210 and serve to supply cooling air to the surface of the airfoil body 210.

Figure 3:
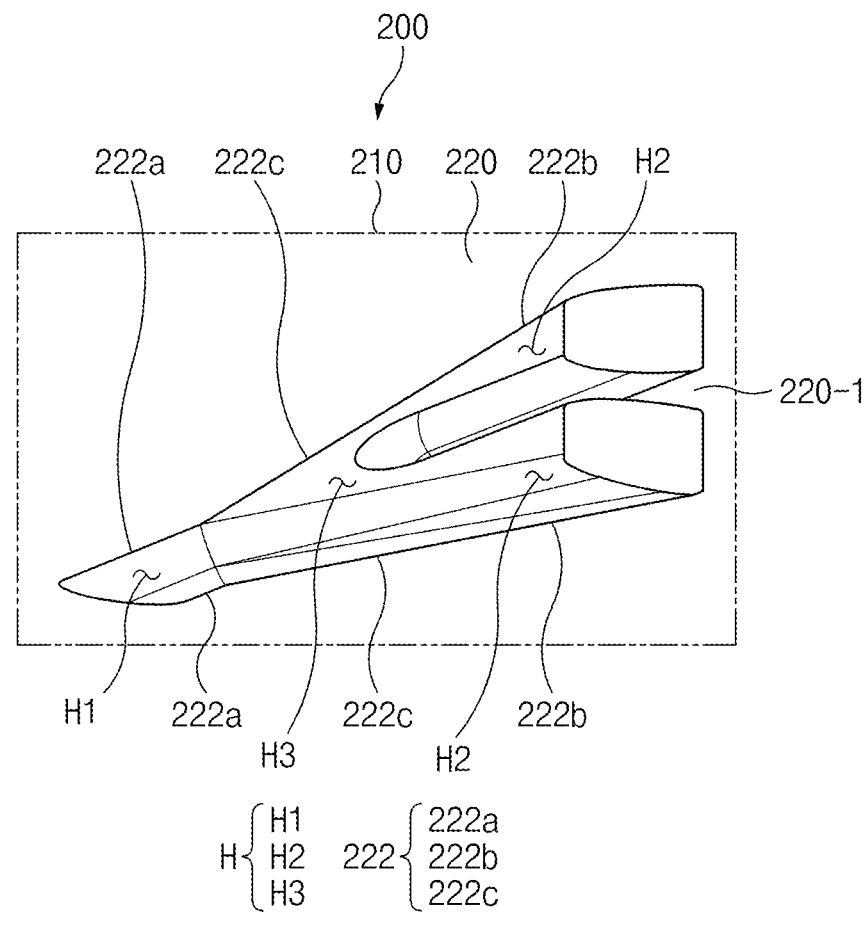
FIG. 3 is a perspective view illustrating an example of a shape of a cooling hole formed in the turbine blade illustrated in FIG. 2.
Figure 4:
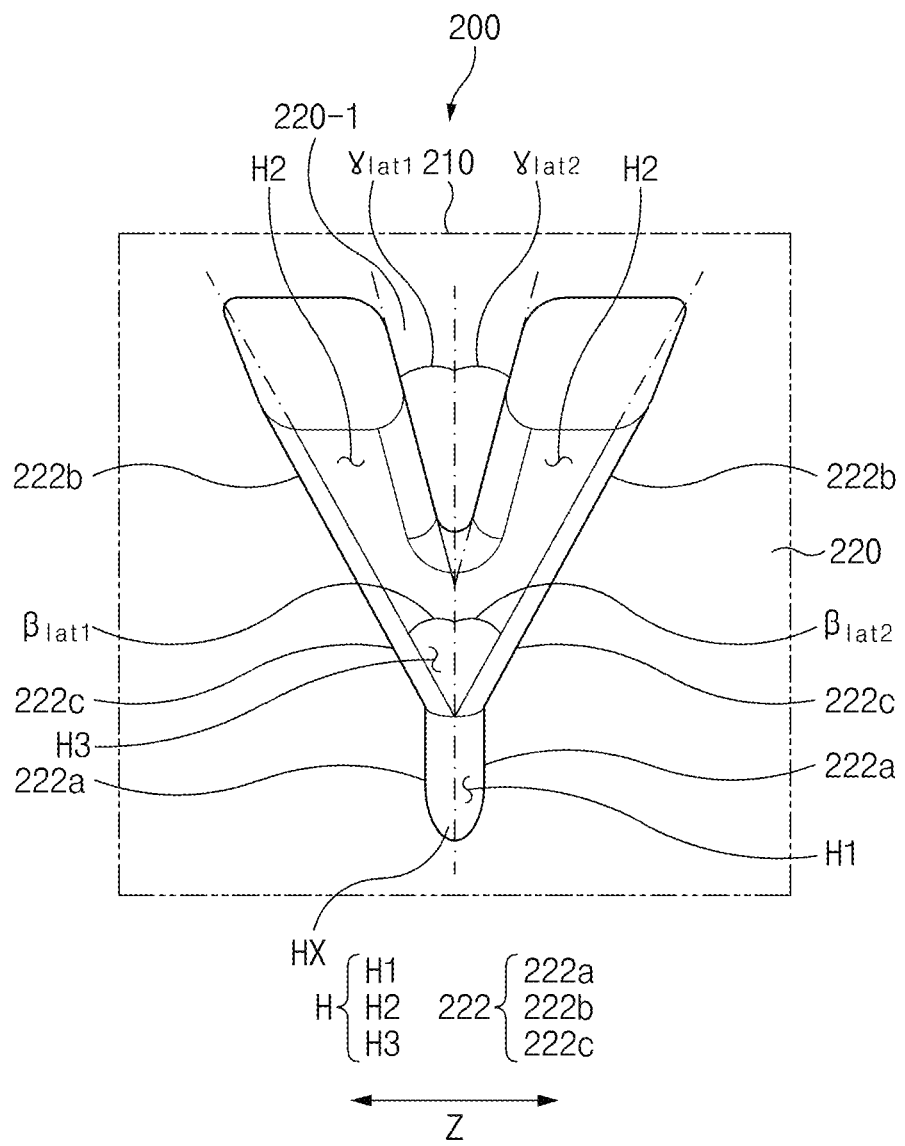
FIG. 4 is a view illustrating a state in which the shape of the cooling hole illustrated in FIG. 3 is cut along a first plane.
Figure 5:
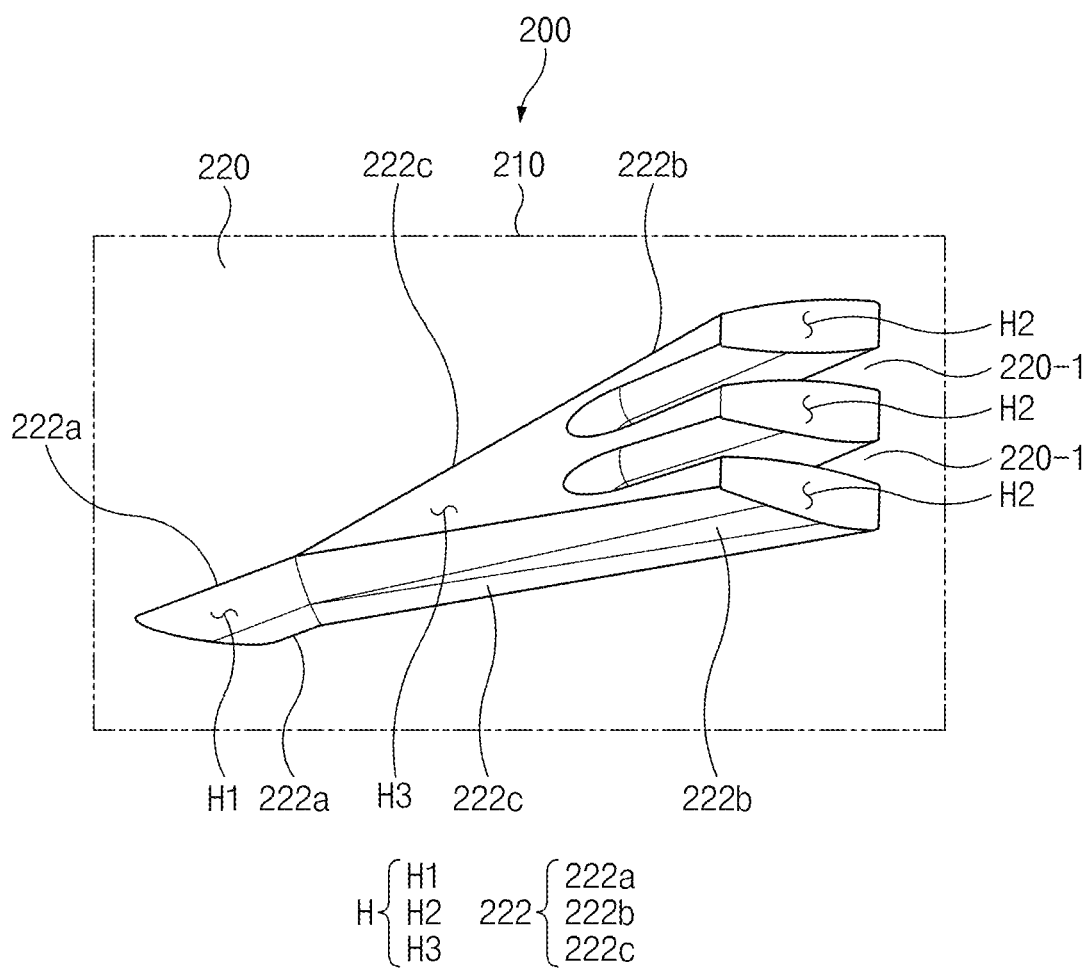
FIG. 5 is a perspective view illustrating another example of a shape of a cooling hole formed in the turbine blade illustrated in FIG. 2.

FIG. 3 is a perspective view illustrating an example of a shape of the cooling hole formed in the turbine blade illustrated in FIG. 2, and FIG. 4 is a view illustrating a state in which a shape of the cooling hole illustrated in FIG. 3 is cut along a first plane. FIG. 5 is a perspective view illustrating another example of a shape of a cooling hole formed in the turbine blade illustrated in FIG. 2.

With reference to FIGS. 3 to 5, the turbine airfoil 200 according to the present disclosure may include the airfoil body 210 including an outer wall 220 configured to define the internal space. The cooling hole H may be formed in the outer wall 220 and allow the internal space to communicate with an external space of the airfoil body 210.

The outer wall 220 of the airfoil body 210 may have a surface that is convexly curved outward, forming a suction side surface (SS), and a surface that is concavely curved inward, forming a pressure side surface (PS). This configuration maximizes the pressure differential between the pressure side surface (PS) and the suction side surface (SS) of the airfoil body 210, while also allowing for a smooth gas flow around the airfoil body 210. The cooling hole H may be form either of or both the pressure side surface (PS) or the suction side surface (SS).

The cooling hole H may be divided into a plurality of regions. More specifically, the cooling hole H may include an inner hole region H1 which communicates with the internal space of the above-mentioned turbine airfoil 200, outer hole regions H2 which communicates with the external space, and a connection hole region H3 which connects the inner hole region H1 and the outer hole regions H2.

The cooling hole H generally extends from the internal space formed inside the airfoil body 210 to the surface of the air foil body 210 so that the cooling air may flow from the inside of internal space of the airfoil to the surface of the airfoil body 210. The inner hole region H1, the connection hole region H3 and the outer hole regions H2 may be formed to extend in general toward the downstream side. A center line of the inner hole region H1 along its extension direction may be referred to as a center line of the cooling hole HX. The outer hole regions H2 may be formed to branch from the connection hole region H3. According to an embodiment, one outer hole region H2 may branch and extend from the connection hole region H3 by being inclined toward radially outward while another outer hole region H2 may branch and extend from the connection hole region H3 by being inclined toward radially inward. The inner hole region H1, the connection hole region H3 and the outer hole regions H2 may be formed to position at a same virtual flat plane, which extends in the radial direction.

Meanwhile, the above-mentioned outer wall 220 may have an inner surface 222 which defines the entire shape of the cooling hole H. The inner surface 222 may include a first inner surface 222a which defines the inner hole region H1, second inner surfaces 222b which defines the outer hole regions H2, and a third inner surface 222c which defines the connection hole region H3.

The first inner surface 222a and the third inner surface 222c may be distinguished by a bend at their boundary. More specifically, the third inner surface 222c may be formed with a bend (i.e., may be angled) relative to the first inner surface 222a at the point (i.e., boundary or junction) where the first inner surface 222a and the third inner surface 222c meet.

According to an embodiment of the present disclosure, the outer hole regions H2 may be provided as a plurality of outer hole regions H2 spaced apart from one another. Therefore, the outer wall 220 may include regions that separate these multiple outer hole regions H2. Specifically, the outer wall 220 may include a partition section 220-1. The partition section 220-1 may be formed between the two adjacent outer hole regions H2. FIGS. 3 and 4 illustrate an example with two outer hole regions H2, while FIG. 5 illustrates an example with three outer hole regions H2.

As the plurality of outer hole regions H2 are provided, the second inner surface 222b, which defines the outer hole regions H2, may also be divided into a plurality of regions. That is, the second inner surface 222b may include i) a section connected to the third inner surface 222c and ii) a section that is not connected to the third inner surface 222c.

The section of the second inner surface 222b, which is connected to the third inner surface 222c, may refer to a section positioned relatively outer side (i.e., radially outward or radially inward in the radial direction Z; i.e., relatively farther from the center line of the cooling hole HX) than other sections of the second inner surface 222b. Thus, such section of the second inner surface 222b connected to the third inner surface 222c may be referred to as the 'second inner surface outer section.' On the other hand, the section of the second inner surface 222b, which is not connected to the third inner surface 222c, is may refer to a section positioned relatively inside (i.e., relatively nearer to the center line of the cooling hole HX) than the other sections of the second inner surface 222b. Also, such section may correspond to a boundary surface of the partition section 220-1. Therefore, such section of the second inner surface 222b not-connected to the third inner surface 222c may be referred to as the 'second inner surface partition section.'

In the present specification, the boundary between the second inner surface 222b and the third inner surface 222c may refer to a point at which the second inner surface 222b and the third inner surface 222c are connected directly to each other. The section of the second inner surface 222b at the boundary between the second inner surface 222b and the third inner surface 222c may refer to the second inner surface outer section.

As described above, the first inner surface 222a and the third inner surface 222c may be distinguished based on the boundary at which the inner surfaces are bent. In contrast, the second inner surfaces 222b and the third inner surface 222c may be distinguished based on a position where the plurality of outer hole regions H2 begin to branch off from the connection hole region H3. More specifically, the plurality of outer hole regions H2 may branch off (i.e., diverge)

from the connection hole region H3 at the boundary between the outer hole region H2 and the connection hole region H3. Accordingly, the boundary between the second inner surface 222*b* and the third inner surface 222*c* may be defined in the section where the branching of the outer hole regions H2 occurs.

Meanwhile, referring to FIGS. 3 and 4, the features of the inner hole region H1, the outer hole regions H2, the connection hole region H3 and their inner surfaces are described with reference to a first cross-section of a portion of the airfoil body 210 of the turbine airfoil 200. The first cross-section may be made by cutting the portion of the airfoil body 210 along a first plane. The first plane may be a virtual plane that crosses or passes through each of the inner hole region H1, the connection hole region H3, and the outer hole regions H2. The first place may be a virtual plane extending along the radial direction Z. Therefore, the first cross-section may be made by cutting the first inner surface 222*a*, the second inner surface 222*b*, and the third inner surface 222*c*.

In the first cross-section made based on the first plane, the direction in which the third inner surface 222*c* is bent with respect to the first inner surface 222*a* at the boundary between the first inner surface 222*a* and the third inner surface 222*c* positioned at one side (e.g., the left side based on FIG. 4) of the cooling hole H may be different from the direction in which the third inner surface 222*c* is bent with respect to the first inner surface 222*a* at the boundary between the first inner surface 222*a* and the third inner surface 222*c* positioned at the other side (e.g., the right side based on FIG. 4) of the cooling hole H. FIG. 4 illustrates a state in which the third inner surface 222*c* is bent with respect to the first inner surface 222*a* in a counterclockwise direction at the left side of the cooling hole H, and the third inner surface 222*c* is bent with respect to the first inner surface 222*a* in a clockwise direction at the right side of the cooling hole H. That is, assuming that the airfoil is assembled in the rotor disc 180, a first portion of the third inner surface 222*c* may be bent radially outward in the radial direction Z and a second portion of the third inner surface 222*c* may be bent radially inward in the radial direction Z, while the inner hole region H1 and the first inner surface 222*a* may be positioned in a constant radial position.

In addition, in the first cross-section of the airfoil body 210 made based on the first plane, the plurality of outer hole regions H2 may be provided to be spaced apart from one another in an extension direction of the first plane, that is the radial direction Z.

With continued reference to FIGS. 3 to 5, in the first cross-section of the airfoil body 210 made based on the first plane, an angle defined between the center line of the cooling hole HX and a straight line parallel to the third inner surface 222*c* at a boundary between the first inner surface 222*a* and the third inner surface 222*c* positioned at one side (e.g., the left side based on FIG. 4) of the cooling hole H is $\beta_{lat1}$, an angle defined between a straight line parallel to the first inner surface 222*a* and a straight line parallel to the third inner surface 222*c* at a boundary between the first inner surface 222*a* and the third inner surface 222*c* positioned at the other side (e.g., the right side based on FIG. 4) of the cooling hole H is $\beta_{lat2}$. The size of the angle $\beta_{lat2}$ and the size of the angle $\beta_{lat2}$ may be equal to each other. In addition, in the first cross-section of the airfoil body 210 made based on the first plane, the second inner surfaces 222*b* connected to the third inner surface 222*c* (i.e., the second inner surface outer section) may extend continuously and straightly from the third inner surface 222*c* in a same direction.

In addition, as illustrated in FIG. 4, in the first cross-section of a portion of the airfoil body 210 made based on the first plane, angles defined between the second inner surface partition section provided at the boundaries of the partition section 220-1, which separates the outer hole regions H2, and the center line of the cooling hole HX are $\gamma_{lat1}$ and $\gamma_{lat2}$. The sizes of the angles ($\beta_{lat1}$, $\beta_{lat2}$) defined between the center line of the cooling hole HX and the straight lines parallel to the third inner surface 222*c* at the boundary between the first inner surface 222*a* and the third inner surface 222*c* may be equal to or larger than the sizes of $\gamma_{lat1}$ and $\gamma_{lat2}$. In this case, $\gamma_{lat1}$ may be defined as the angle defined between the straight line parallel to the second inner surface partition section of the second inner surface 222*b* positioned at one side boundary (e.g., the left side based on FIG. 4) of the partition section 220-1 and the center line of the cooling hole HX, and $\gamma_{lat2}$ may be defined as the angle defined between the straight line parallel to the second inner surface partition section of the second inner surface 222*b* positioned at the other side boundary (e.g., the right side based on FIG. 4) of the partition section 220-1 an the center line of the cooling hole HX.

According to an embodiment, the sizes of $\beta_{lat1}$ and $\beta_{lat2}$ may be larger than the sizes of $\gamma_{lat1}$ and $\gamma_{lat2}$. When the sizes of $\beta_{lat1}$ and $\beta_{lat2}$ are lager than the sizes of $\gamma_{lat1}$ and $\gamma_{lat2}$, the internal width of the outer hole region H2 measured in the radial direction Z may gradually increase.

Meanwhile, the sizes of $\gamma_{lat1}$ and $\gamma_{lat2}$ may each be 0 degrees or larger. In this case, the case in which the sizes of $\gamma_{lat1}$ and $\gamma_{lat2}$ are each 0 degrees may be understood as a case in which the second inner surface partition section of the second inner surface 222*b* and the first inner surface 222*a* are formed in parallel with each other.

Meanwhile, in the first cross-section of the airfoil body 210 made based on the first plane, the magnitude of $\gamma_{lat1}$ and the magnitude of $\gamma_{lat2}$ may be equal to each other. In addition, the sizes of the angles ($\beta_{lat1}$, $\beta_{lat2}$) may be 10 degrees or more and 30 degrees or less. For example, if the sizes of the angles ($\beta_{lat1}$ and $\beta_{lat2}$) are smaller than 10 degrees or larger than 30 degrees, the flow rates of the cooling fluid sprayed through the outer hole regions H2 are not uniform, or the processability of the cooling hole H may deteriorate. In addition, an area of each of the plurality of outer hole regions H2 may be 1.0 or more times an area of the inner hole region H1 so that the cooling fluid may smoothly flow in the outer hole regions H2, when the area of the inner hole region H1 or each of the plurality of outer hole regions H2 is defined as a size of their inner areas in a cross-sectional virtual plane perpendicular to their extension directions.

With continued reference to FIGS. 3 to 5, the outer hole region H2 and the connection hole region H3 may each include a shape having a width that increases as the distance from the external space of the turbine airfoil decreases. The width of the outer hole region H2 and the connection hole region H3 may be defined in the radial direction Z. More specifically, in the first cross-section of the airfoil body 210 made based on the first plane, the outer hole region H2 may include or be configured only by a section in which a width thereof gradually increases toward the external space of the turbine airfoil, and the connection hole region H3 may include or be configured only by a section in which a width thereof gradually increases toward the external space of the turbine airfoil. In contrast, in the first cross-section of the airfoil body 210 made based on the first plane, the inner hole region H1 may include or be configured only by a section in which a width thereof is constant.

Meanwhile, the features of the inner hole region H1, the outer hole regions H2, the connection hole region H3 and their inner surfaces are described with reference to a second cross-section of a portion of the airfoil body 210. The second cross-section may be made by cutting the turbine airfoil along a second plane. The second plane may be a virtual plane that intersects the first plane. For example, the second plane may be a plane perpendicularly intersecting the first plane.

More specifically, in the second cross-section of the airfoil body 210 made by cutting, along the second plane intersecting the first plane, the region including the first inner surface 222a, the second inner surface 222b, and the third inner surface 222c, the outer hole section H2 or the connection hole section H3 may include a section in which a width thereof is constant. More particularly, in the second cross-section of the airfoil body 210 made by cutting, along the second plane intersecting the first plane, the region including the first inner surface 222a, the second inner surface 222b, and the third inner surface 222c, the outer hole section H2 and the connection hole section H3 may be configured only by the section in which the width thereof is constant.

In addition, in the second cross-section of the airfoil body 210 made by cutting, along the second plane intersecting the first plane, the region including the first inner surface 222a, the second inner surface 222b, and the third inner surface 222c, the first inner surface 222a, the second inner surface 222b, and the third inner surface 222c may be positioned on the same plane.

According to the present disclosure, the plurality of outer hole regions H2 are configured to form the spaces (i.e., passages) through which the cooling fluid is sprayed to the outside of the turbine airfoil. A partition section is provided between the adjacent outer hole regions H2, allowing the cooling fluid supplied from the connection hole region H3 to be closely applied to the inner surface of the partition section before being discharged to the outside. Therefore, even though the outer hole regions H2 are shaped to widen toward the external space, flow separation of the cooling fluid is prevented, and thereby maximizing a film cooling effect.

In addition, according to the present disclosure, the cross-sectional area of the cooling fluid discharge region is reduced compared to a configuration in which a single hole occupies the combined space of the outer hole region and the partition section. As a result, the momentum of the cooling fluid is maintained, reducing the risk of excessive velocity loss and minimizing rapid dilution with the combustion gas.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A turbine airfoil comprising:

an airfoil body comprising an outer wall configured to define an internal space and a cooling hole formed in the outer wall, wherein the cooling hole allows the internal space and an external space of the airfoil body to communicate with each other, wherein the cooling hole is defined by an inner surface of the outer wall, the inner surface of the outer wall comprises:

a first inner surface which defines an inner hole region of the cooling hole that communicates with the internal space; and a second inner surface which defines an outer hole region of the cooling hole that communicates with the external space, wherein the outer hole region is provided as a plurality of outer hole regions, each spaced apart from another, wherein the outer wall comprises a partition section provided between two adjacent outer hole regions, wherein the inner surface of the outer wall further comprises a third inner surface configured to define a connection hole region of the cooling hole that connects the inner hole region and the outer hole region, and wherein the plurality of outer hole regions branch off from the connection hole region, wherein, when a first cross-section of the airfoil body is defined by a section made by cutting, along a first plane, a region comprising the first inner surface, the second inner surface, and the third inner surface, in the first cross-section of the airfoil body, a direction in which the third inner surface positioned at one side of the cooling hole is bent relative to the first inner surface and a direction in which the third inner surface positioned at the other side of the cooling hole is bent relative to the first inner surface are opposite to each other.

2. The turbine airfoil of claim 1, wherein in the first cross-section of the airfoil body, the plurality of outer hole regions are provided to be spaced apart from one another in an extension direction of the first plane.

3. The turbine airfoil of claim 1, wherein in the first cross-section of the airfoil body, a size of an angle ($\beta_{lat1}$) defined between a straight line parallel to the first inner surface and a straight line parallel to the third inner surface positioned at one side of the cooling hole is equal to a size of an angle ($\beta_{lat2}$) defined between the straight line parallel to the first inner surface and a straight line parallel to the third inner surface positioned at the other side of the cooling hole.

4. The turbine airfoil of claim 1, wherein in the first cross-section of the airfoil body, the second inner surface and the third inner surface are positioned on a same plane.

5. The turbine airfoil of claim 4, wherein in the first cross-section of the airfoil body, a size of an angle ($\gamma_{lat1}$) defined between a straight line parallel to the second inner surface provided at one side boundary of the partition section and the straight line parallel to the first inner surface is equal to a size of an angle ($\gamma_{lat2}$) defined between a straight line parallel to the second inner surface provided at the other side boundary of the partition section and the straight line parallel to the first inner surface.

6. The turbine airfoil of claim 5, wherein in the first cross-section of the airfoil body, the sizes of the angles ($\beta_{lat1}$, $\beta_{lat2}$) are equal to or larger than the sizes of the angles ($\gamma_{lat1}$, $\gamma_{lat2}$).

7. The turbine airfoil of claim 4, wherein in the first cross-section of the airfoil body, the sizes of the angles ($\beta_{lat1}$, $\beta_{lat2}$) are 10 degrees or more and 30 degrees or less.

8. The turbine airfoil of claim 1, wherein an area of each of the plurality of outer hole regions is 1.0 or more times an area of the inner hole region.

9. The turbine airfoil of claim 1, wherein in the first cross-section of the airfoil body, the connection hole region comprises a section in which a width thereof increases as a distance from the external space decreases.

10. The turbine airfoil of claim 1, wherein in the first cross-section of the airfoil body, the outer hole region comprises a section in which a width thereof increases as a distance from the external space decreases.

11. The turbine airfoil of claim 1, wherein in the first cross-section of the airfoil body, the inner hole region comprises a section in which a width thereof is constant.

12. The turbine airfoil of claim 1, wherein when a second cross-section of the airfoil body is defined by a section made by cutting, along a second plane intersecting the first plane, the region comprising the first inner surface, the second inner surface, and the third inner surface, in the second cross-section of the airfoil body, the inner hole section, the outer hole section, or the connection hole section comprises a section in which a width thereof is constant.

13. The turbine airfoil of claim 1, wherein when a second cross-section of the airfoil body is defined by a section made by cutting, along a second plane, a region comprising the first inner surface, the second inner surface, and the third inner surface, in the second cross-section of the airfoil body, the first inner surface, the second inner surface, and the third inner surface are positioned on the same plane.

14. A gas turbine comprising:

a compressor section configured to supply compressed air;

a combustor configured to receive the compressed air discharged from the compressor section and produce a combustion gas by combusting the compressed air; and a turbine section configured to receive the combustion gas produced by the combustor and comprising a plurality of turbine airfoils, wherein each of the plurality of turbine airfoils comprises an airfoil body comprising an outer wall configured to define an internal space and a cooling hole formed in the outer wall and, wherein the cooling hole allows the internal space and an external space of the airfoil body to communicate with each other, wherein the cooling hole is defined by an inner surface of the outer wall, the inner surface of the outer wall comprises:

a first inner surface which defines an inner hole region of the cooling hole that communicates with the internal space; and a second inner surface which defines an outer hole region of the cooling hole that communicates with the external space, wherein the outer hole region is provided as a plurality of outer hole regions, each spaced apart from another, and wherein the outer wall comprises a partition section provided between two adjacent outer hole regions, wherein the inner surface of the outer wall further comprises a third inner surface configured to define a connection hole region of the cooling hole that connects the inner hole region and the outer hole region, and wherein the plurality of outer hole regions branch off from the connection hole region, wherein, when a first cross-section of the airfoil body is defined by a section made by cutting, along a first plane, a region comprising the first inner surface, the second inner surface, and the third inner surface, in the first cross-section of the airfoil body, a direction in which the third inner surface positioned at one side of the cooling hole is bent relative to the first inner surface and a direction in which the third inner surface positioned at the other side of the cooling hole is bent relative to the first inner surface are opposite to each other.

* * * * *